United States Patent

[11] 3,582,777

[72] Inventor Irwin Wunderman
 Mountain View, Calif.
[21] Appl. No. 742,621
[22] Filed July 5, 1968
[45] Patented June 1, 1971
[73] Assignee Physics International Company
 San Leandro, Calif.

[54] ELECTRONIC METERING SYSTEM
 30 Claims, 5 Drawing Figs.

[52] U.S. Cl. .................................. 324/105,
 324/99, 324/115
[51] Int. Cl. .................................... G01r 5/22,
 G01r 15/08
[50] Field of Search .......................... 324/65, 99,
 99 D, 115, 105

[56] References Cited
 UNITED STATES PATENTS
 2,870,408 1/1959 Draganjac .................. 324/115
 2,884,786 5/1959 Burk et al. .................. 324/65X
 2,889,518 6/1959 Hudson et al. ............. 324/99X
 2,996,669 8/1961 Morgan et al. ............. 324/99

Primary Examiner—Rudolph V. Rolinec
Assistant Examiner—Ernest F. Karlsen
Attorneys—Samuel Lindenberg and Arthur Freilich ABSTRACT: A quantum radiometer is provided for use with different photovoltaic cells in probes, each with a different wavelength filter. Temperature compensating, calibrating and scaling resistors mounted in a given probe comprise a voltage divider connected to the output of a low input impedance amplifier. The cell in the probe is connected directly to the input of the amplifier. A switch converts the arrangement of the resistors in the voltage divider to change the output from radiant power (watts) to photocurrent (optical amperes or photons/second). A digital display unit connected to the output of the voltage divider provides numerical display with a fixed radix point and a constant scaling factor. A variable exponent for the scaling factor is changed automatically as the gain of the amplifiers is altered to (1) provide in the display a nonzero digit in the most significant position and (2) prevent a carry out of the most significant digit position. Offset current may be introduced at the voltage divider, such as to introduce a conversion constant.

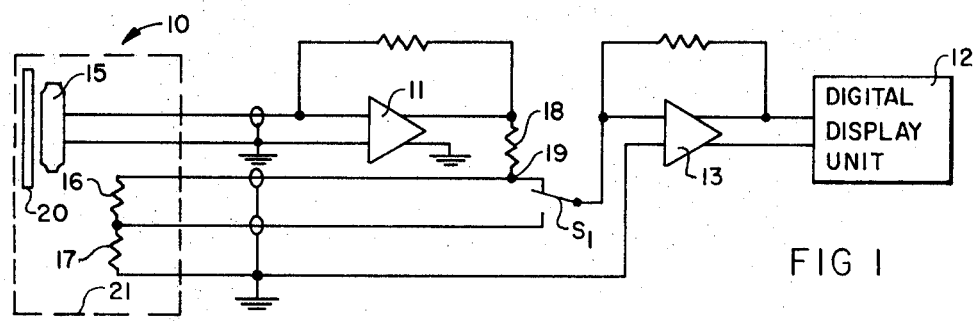
FIG 1
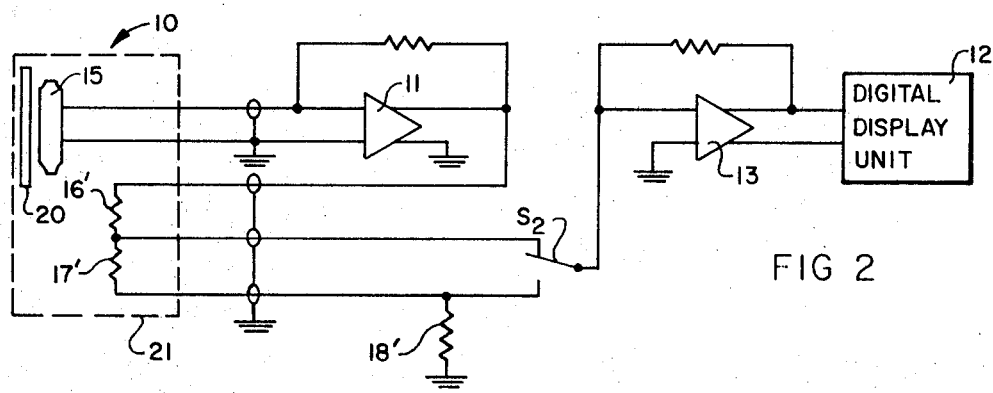
FIG 2
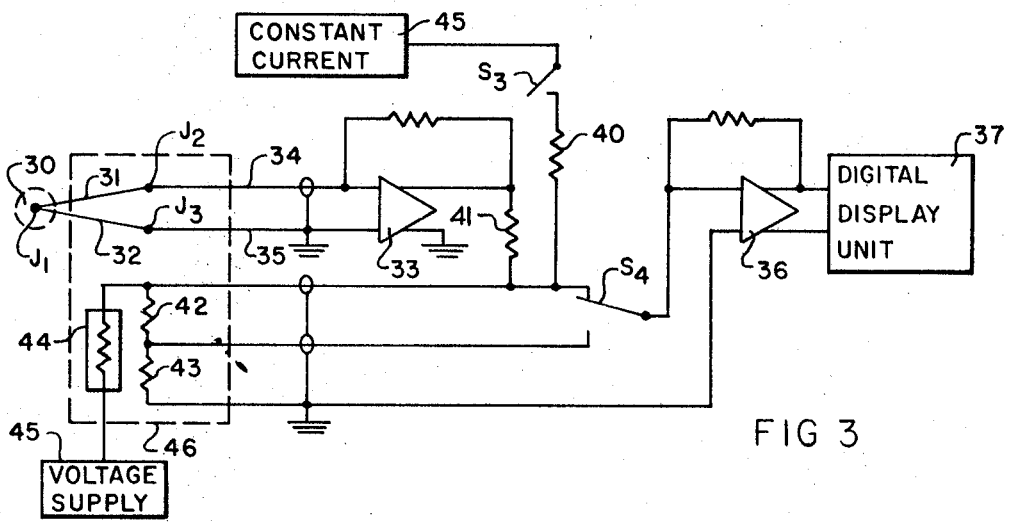
FIG 3
FIG 5
INVENTOR
IRWIN WUNDERMAN
BY Lindenberg & Freilich
ATTORNEY 3,582,777

ELECTRONIC METERING SYSTEM

BACKGROUND OF THE INVENTION

1. Field of the Invention

This invention relates to an electronic metering system adapted to be used with different types of transducers, and in particular to means for compensating, calibrating and scaling data for display in an electronic metering system.

2. Description of the Prior Art

Most transducers have accuracies of one percent, or better, over only a limited range of environmental conditions. For example, the output current of a photosensitive cell is linearly related to illumination for a given wavelength, but temperature dependent, increasing about 2.1 percent per °C. If illumination at different wavelengths is to be measured, calibration for each different wavelength (1) is required as well as compensation for variation in temperature. For instance, the relative response of a selenium cell to 1 of 400 $\mu$ is approximately 67 percent the response to 1 of approximately 560$\mu$. The efficiency of the selenium cell decreases rapidly at greater wavelengths to about 40 percent at 660 $\mu$ and less than 10 percent at 700$\mu$. Silicon cells, on the other hand, are most efficient at 800$\mu$, and fall off below and above that to less than 10 percent at about 380 and 1100$\mu$, respectively. As another example, the output signal from an accelerometer of velocity transducer may depend in part upon environmental conditions, such as temperature, pressure or humidity. The use of such transducers in an application requiring precision in calibration is feasible only through the use of compensation networks, but it has been found that such networks connected in series or in shunt with the transducer ahead of its amplifier reduces the sensitivity of the transducer.

Another problem is that transducers of the same type from the same manufacturer typically vary in sensitivity by considerably more than one percent. Thus, if different transducers are to be used with a single electronic metering system, each must be calibrated so that when interchanged, they all indicate the appropriate reading. The inclusion of such calibrating networks, often simply resistors in shunt or in series with the transducer, further reduces the ultimate sensitivity.

Sometimes it is desirable to change the scale of the metering system for a given transducer. The provision of shunt or series resistors for that purpose ahead of the amplifier also reduces the sensitivity of the transducer.

Once any compensation or calibration necessary has been provided for a given transducer, it is common practice to provide a digital display, as with a digital voltmeter. If scaling is required because a limited number of digits are provided for the display, it is necessary to either move the decimal point or display the scaling factor. The latter makes direct reading by the operator difficult, and the former requires a complex system to move the decimal point. In either case, the scaling is accomplished by either varying the gain of an amplifier, as by changing feedback impedance in an operational amplifier, or varying the calibrating network.

It is often desirable to introduce some offset to the signal of an electronic metering system. That is automatically done through a network coupling a transducer to an amplifier. The network may be one provided for compensation or calibration, or may be especially provided for the purpose, but in any case, sensitivity of the transducer may be affected adversely by the network.

OBJECTS AND SUMMARY OF THE INVENTION

An object of this invention is to provide an electronic metering system with means for compensating, or calibrating, or both compensating and calibrating a transducer without appreciably degrading sensitivity.

Another object of this invention is to provide an electronic metering system for use with a plurality of different transducers.

Yet another object is to provide an improved means for introducing an offset in an electronic metering system.

Still another object is to provide an electronic metering system with means for scaling and means for displaying both a fixed number of significant digits and a scale factor with a variable exponent in direct readable form.

Briefly, in accordance with the present invention, a given transducer is provided in a probe with impedance means for calibrating the transducer. That means is subjected to the same environmental condition as the transducer (for example temperature) that affects its performance thereby compensating for variations in the environmental conditions. The probe is then connected directly to an amplifier, with the transducer connected to the input thereof and the impedance means so connected to the output of the amplifier as to form a part of a voltage dividing network, thereby calibrating the output signal for the particular transducer while compensating the output signal for variations in the critical environmental condition, both without affecting the sensitivity of the transducer. The compensating impedance may be divided into two sections and a second output terminal provided at a junction therebetween, to scale the output signal or to otherwise introduce a predetermined conversion factor by switching from one output terminal to another. An offset may be introduced at the output of the amplifier by adding a signal thereto from a signal offset source without affecting the sensitivity of the transducer.

The output terminal of the compensating, calibrating, and scaling network is coupled to a digital display unit comprising a converter and a numerical display of a predetermined number of digits. A fixed radix point (for example decimal) is displayed with those digits together with a constant factor indicator of a value equal to the radix of the converter and a variable exponent for the constant factor. Automatic range control means monitors the most significant digit position of the converter to so control the gain of the signal transmitting network between the transducer and the analog-to-digital converter that there is a digit greater than zero displayed therein but that the capacity of the display is not exceeded as gain is changed by a fixed increment equal to the radix of the converter once during each analog-to-digital conversion cycle of a fixed period (for example 1 second). A bidirectional counter is employed with the automatic range control means to change the exponent accordingly.

Further objects and advantages will become apparent from the following detailed description of preferred embodiments of the invention the novel features of which are set forth in their broadest aspects in the appended claims. That will best be understood from the detailed description when read with reference to the accompanying drawings.

BRIEF DESCRIPTION OF THE DRAWINGS

FIG. 1 illustrates a first embodiment of the present invention.

FIG. 2 illustrates a second embodiment of the present invention.

FIG. 3 illustrates a third embodiment of the present invention.

FIG. 5 illustrates a numerical display for a second mode of operation of the system of FIG. 4.

DESCRIPTION OF THE PREFERRED EMBODIMENTS

Figure 4:
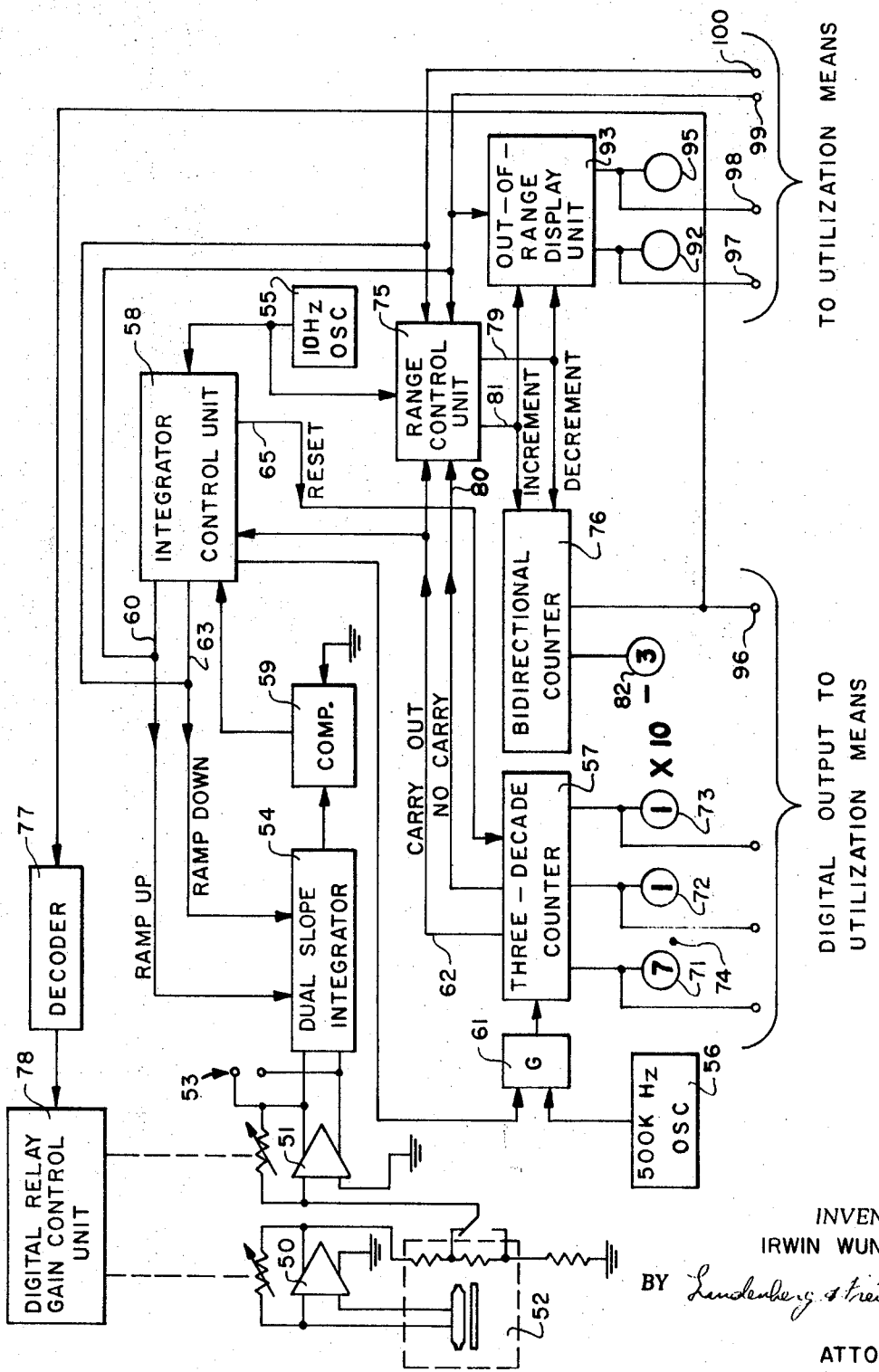
FIG. 4 illustrates an improved numerical display system for an electronic metering system.

Referring now to FIG. 1, an electronic metering system is disclosed comprising a transducer probe 10, a low input impedance amplifier 11 and a digital display unit 12 coupled to the amplifier 11 by an amplifier 13. In accordance with the present invention, the probe 10 includes a transducer 15 connected directly to the input of the amplifier 11, and compensating resistors 16 and 17 connected to the output of the amplifier 11. A third resistor 18 is connected in series with resistors 16 and 17 in order to provide at a junction 19 an output signal which varies in proportion to variations in the ratio of the sum of the compensating resistors 16 and 17 to the sum of all resistors 16, 17 and 18.

The sum of the resistors 16 and 17 is so selected in proportion to the resistor 18 as to calibrate the output signal transmitted to the display unit 12 for the efficiency of the transducer. If the ratio of the resistors 16 and 17 to the sum of the resistors 16, 17 and 18 is selected to provide a voltage divider transmission factor of X for a transducer of 100 percent efficiency and a predetermined gain of the amplifier 11, the ratio for a transducer of less efficiency would be correspondingly greater. For instance, given a transducer of 80 percent efficiency, the resistors 16 and 17 would be selected to provide a transmission factor of 100X/80. To compensate for variations in temperature, the resistors 16 and 17 are selected to have a temperature coefficient of a sign opposite that of the transducer. For instance, if the efficiency of the transducer increases with temperature, a negative temperature coefficient is selected for the resistors 16 and 17 if the relative positions of the resistors are reversed in the voltage dividing network, as shown in FIG. 2, such that the output is taken across resistor 18; the temperature coefficient selected would be positive.

In an exemplary electronic metering system, the transducer 15 in the embodiment of FIG. 2 comprises a silicon photovoltaic cell. The efficiency of the cell is temperature dependent. It increases about 0.21 percent per degree Centigrade over a temperature range of about 15° C. to b 45° C. Therefore, to compensate for variations in temperature, the resistors 16' and 17' are selected to have a corresponding positive temperature coefficient of 0.23 percent/° C. The resulting transmission factor would then vary as a function of variations in the environmental condition which affects the resistance of resistors 16' and 17'. In that manner, calibration and compensation may be provided without diverting any current from the input of the amplifier 11 which is preferably an operational amplifier operating in a current to voltage conversion mode.

A filter 20 is provided in the probe in order that only radiation of a desired wavelength be measured. Since the quantum efficiency of a given cell and filter combination varies for different wavelengths, as noted hereinbefore, the ratio of the resistors 16 and 17 to the sum of all of the resistors 16, 17 and 18 is selected accordingly in the embodiment of FIG. 1. It should be noted that the corresponding ratio for the embodiment illustrated in FIG. 2 is the ratio of resistor 18' to the sum of all resistors 16', 17' and 18'.

If the cell 15 is to be used for monitoring the level of optical radiation in a confined area, the probe 10 in which it is mounted is preferably made small and connected to the amplifier 11 with shielded cables. The mounting should be so made as to place compensating and calibrating resistors (16, 17 in FIG. 1 and 16', 17' in FIG. 2) in good thermal contact with each other and the cell 15, such as through an aluminum mounting block or thermally conductive cement as represented in the drawings by a dotted line 21. Since the cell 15 provides an output which appears to the amplifier 11 as a current source, and optimum signal to noise ratio results when all of the current is fed into the amplifier 11, it is advantageous to have the calibration and compensation network connected to the output of the amplifier, rather than the input as in the prior art.

When a switch $S_2$, is in the position shown in FIG. 2 for a quantum radiometer, output from the display unit 12 is in terms of radiant power (watts) for photon energy of radiation received through the narrow pass filter 20 by the cell 15. This is so because in the photoelectric absorption produced by a photon impinging an electron, a single electron theoretically flows for each absorbed photon. Taking quantum efficiency into consideration, the photocurrent produced by the transducer is proportional to the number of photons per second in the radiation thereon, and since each photon is of known energy as selected by the filter, the power of impinging photons is proportional to the number of photons per second times the energy of each photon. By properly selecting the ratio of resistance for the resistors 16' and 17', the output of display unit 12 is changed by the switch $S_2$ in its alternate position from radiant power (watts) to photocurrent (optical amperes or photons per second). One formula for selecting resistors 16' and 17' (with resistor 18' having a value of 500 ohms) to account for quantum efficiency and wavelength would resistor $$16' = 2000\ N - \left(\frac{1.24}{\lambda}\right) 500 \text{ and resistor } 17' = \left(\frac{1.24}{\lambda} - 1\right) 500$$

where $N$ is the relative quantum efficiency of the photocell-filter combination and $\lambda$ is the wavelength of the filter passband centroid in microns. For example, with a filter 20 selectively passing light of 632.8 $\mu$ (or 1.97 electron volts), the resistors 16', 17' and 18' are selected for a relative quantum efficiency of unity to have the values 1015, 485 and 500 ohms, respectively.

As a further example, with filtered light of 1000 $\mu$ (1.24 ev.) and a relative cell and filter quantum efficiency 50 percent, the values of resistors 16' and 17' are selected to be 120 and 380 ohms, respectively. The value of the resistor 18' remains the same, as does the gain of the amplifier 13 arbitrarily selected to be 1000. As will be described hereinafter with reference to FIG. 4, the gain of amplifier 11 is automatically changed by a factor of, for example, up to $10^7$ by digital range control system. The same coefficient is introduced by the operation of switch $S_1$ in the embodiment of FIG. 1 by selectively placing it in its alternate position. In such an embodiment, the resistors 16, 17 and 18 are selected to have the values 485, 500 and 1015, respectively.

Since the efficiency of cells of the same type for different wavelengths vary by as much as ± 20 percent, and the calibrating ratios involving resistors 17' plus 18' to resistor 18' in FIG. 2 for radiant energy and optical beam current are related by a known coefficient (namely the photon energy in ev=1.24/$\lambda$, a quantum radiometer to be used with more than one probe can be designed to automatically interrogate the probe and establish which wavelength probe is connected. That would be accomplished by applying a fixed voltage (for example, proportional to 1.24 volt) to the junction between resistors 16' and 17' in FIG. 2, and noting the values at the output across resistor 18' produced thereby with the switch $S_2$ of FIG. 2 in the lower position. The voltage across resistor 18 would then be 0.6328 volts which is proportional to the probe wavelength. The value is unique and therefore identifies a particular wavelength probe.

Referring now to FIG. 3, a second embodiment of the present invention is disclosed employing a thermocouple 30 as a transducer to monitor temperature. The thermocouple 30 consists of a junction $J_1$ between dissimilar metals 31 and 32 selected for a particular environment and operating requirements. For instance, the metals 31 and 32 may consist of iron and constantan, respectively, which generate a thermoelectric electromotive force as a function of the temperature $T_1$ of junction $J_1$.

An amplifier 33 is connected to the thermocouple by copper leads 34 and 35. Since junctions $J_2$ and $J_3$ between the copper leads and the dissimilar metals of the thermocouple 30 also generate thermoelectric electromotive forces in the circuit as a function of their temperature $T_2$, the output of the amplifier 33 is proportionate only to the difference in temperature $(T_1 - T_2)\ K_T$ where $T_1$ is the absolute temperature of the thermocouple 30 and $K_T$ is a constant conversion factor relating volts to degrees of temperature (plus an arbitrary constant) in the desired units such as Kelvin, Rankine, Fahrenheit or Centigrade. Accordingly, to determine the absolute temperature of the thermocouple 30, it is necessary either to measure the temperature $T_2$ and add it in digital form to the digital output of the instrument or to compensate by adding to the analog signal from the amplifier output a signal equal to $+AT_2K$ where A is the gain of the amplifier 33. If such a signal were added, the signal input to amplifier 36 would be proportional to only $AT_1K_T$ and the output of the digital display unit 37 would read directly in terms of temperature $T_1$.

Since the value of $AT_2K_t$ is a known function of $T_2$ for a specified thermocouple material, a signal proportional to this value can be synthesized with a thermister network thermally connected to temperature block $T_2$. A network 44 of thermisters and resistors in series and parallel in conjunction with a supply voltage 45 can provide a current approximately proportional to $AT_2K_t$ impressed across resistors 42 and 43. Accordingly, the signal into amplifier 36 becomes proportional to $AT_1K_t$ if resistors 42 and 43 are temperature independent.

Switch $S_4$ permits the alteration of a scale factor so that output dimensions in desired units, e.g., Fahrenheit or Centigrade, is feasible. The resistance ratio of resistors 41 and 42 to the total resistance of resistors 41, 42 and 43, is the output scale factor with switch $S_4$ in the position shown. In the alternate position of switch $S_4$, the output signal would be reduced, for example, by the ratio 5/9 (the ratio of the slopes of the Fahrenheit and Centigrade scales). A constant signal (offset) may be added or subtracted simultaneously at the input of amplifier 36, through the use of switch $S_3$, resistor 40, and current source 45. For example, an offset related to the 32° difference between Fahrenheit and Centigrade can be provided at the same time the ratio of the readings is altered by the ratio 5/9. In that manner, a signal is applied to the analog-to-digital converter 37 which is precisely proportional to either temperature scale dependent upon whether both switches $S_3$ and $S_4$ are in the positions shown or both in their alternate positions. The resistor network 44 is selected with appropriate temperature coefficients and thermally coupled to the reference junctions $J_2$ and $J_3$ between dissimilar metals 31 and 32 and the copper leads 34 and 35. The thermal coupling may be accomplished in any suitable manner, such as by embedding the junctions and resistor network 44 in an aluminum block schematically represented by a dotted line 46. In some applications, one of the dissimilar metals for the thermocouple 30 may be copper, in which case only one reference junction is created which should be thermally coupled to resistor network 44.

A digital display unit for use in an electronic metering system as described with reference to FIGS. 1 to 3 will now be described with reference to FIG. 4. It comprises an analog-to-digital converter having a wide dynamic range, a digital display with a fixed number of significant digits and a scale factor in direct readable form, amplifiers 50 and 51 correspond to amplifiers 11 and 13 of the embodiment illustrated in FIG. 2, but it should be understood that they may also correspond to amplifiers 33 and 36 of the embodiment illustrated in FIG. 3, the only difference being that, as illustrated, the amplifiers 50 and 51 are connected to a quantum radiometer probe 52 corresponding to the probe 10 of the embodiment illustrated in FIG. 2 instead of to a thermocouple as illustrated in FIG. 3. That is to say, amplifiers 50 and 51 may be employed with other types of transducers to equal advantage in the electronic metering system of the present invention.

The analog output of amplifier 51 (present at terminals 53 for recording, if desired) is applied to an analog-to-digital converter comprising a dual-slope integrator 54, a 10 Hz. square wave oscillator 55, a 500 kHz. oscillator 56, a three-decade counter 57, an integrator control unit 58 and a comparator 59. The dual-slope integrator 54 may consist of, for example, an integrating amplifier connected to a reference voltage through a gate controlled by a ramp-up line 60 which is energized by the output of the oscillator 55 through a flip-flop in the control unit 58 which is set at the beginning of a 1-second sampling interval. At the same time the ramp-up line 60 is energized, a gate 61 is enabled to transmit pulses from the oscillator 56 to the counter 57. When 1,000 pulses have been applied to the counter, a carry pulse is transmitted over a line 62 to the integrating control unit 58 to reset the ramp-up control flip-flop and set a ramp-down control flip-flop also in the control unit 58. A line 63 connected to the ramp-down control flip-flop causes the dual-slope integrator 54 to stop integrating the reference voltage and start integrating the unknown voltage from the amplifier 51. The polarity of the reference voltage is selected to be opposite the unknown voltage so that the output of the dual-slope integrator 54 returns to its initial value, such as zero volts (circuit ground potential) after a period of time proportionate to the amplitude of the unknown voltage.

A comparator 59 detects return of the integrator output to its initial value and resets the ramp-down control flip-flop in the control unit 58 to stop further integration of the unknown voltage. At the same time, the gate 61 is disabled via the control unit 58, thereby stopping pulses from the oscillator 56 from being applied to the counter 57. The number thus registered in the counter 57 is retained until another sampling interval is initiated by the oscillator 55 which resets the counter 57 to zero via the control unit 58 and a line 65.

The number registered in the counter 57 at any given time is displayed by a group of decimal display tubes 71, 72 and 73 with a fixed decimal point 74 permanently displayed between the most significant digits as illustrated. A buffer register may be provided between the counter 57 and the display tubes 71 to 73 such that the value being displayed is not changed until the conclusion of a converting cycle, as signified by an output signal from the comparator 59 which would then enable gates to transfer the new number then registered in the counter 57 to the buffer register. However, the provision of such a buffer register is not necessary since each conversion cycle is completed so quickly (in a few milliseconds) that the changing numerals in the display tubes would cycle from zero to 999 and back down to the value of the unknown voltage then present without irritating the operator. In that manner, the value displayed is updated 10 times a second.

If the unknown voltage at the input of the dual-slope integrator 54 is greater than $9.99 \times 10^{16}$, for example, the counter 57 will produce a carry signal over line 62. That carry signal is not effective on the control unit 59 since the ramp-up flip-flop therein is already reset. However, that carry signal is also applied to an automatic range control unit 75. During each sampling period, as determined by the output of the oscillator 55, but after the ramp-up phase established by the control output signal on line 60 from the control unit 58, the range control unit 75 transmits to a bidirectional counter 76 (via a line 79) any carry pulses transmitted by the counter 57 over the line 62, thereby decrementing the bidirectional counter 76.

The bidirectional counter 76 is a single decade counter the output of which is transmitted to a decoder 77 to decrease the combined gain of amplifiers 50 and 51, thereby scaling down the analog output from amplifier 51 by factors of 10 as it is decremented. That may be accomplished in a manner well known to those skilled in the art. For example, if amplifiers 50 and 51 are each high-gain amplifiers with negative feedback, the gain of each may be decreased by decreasing the impedance of the negative feedback path through a digital relay gain control unit 78 as schematically illustrated. Although scaling by gain control of both amplifiers 50 and 51 is illustrated, it should be understood that scaling may be accomplished by gain control of either amplifier alone.

The automatic range control unit 75 also monitors the counter 57 to determine when there has been a failure to produce a carry signal into the most significant decimal digit position. That is accomplished by monitoring over line 80 the carry output terminal from the next most significant decimal digit position. If there has been a failure to carry into the most significant decimal digit position, the bidirectional counter 76 is incremented to increase the combined gain of amplifiers 50 and 51 via the decoder 77 and gain control unit 78. That may be accomplished, for example, by an under-range control flip-flop in the automatic range control unit 75 which is set by the trailing edge of the ramp-up signal on line 60 and reset by a carry signal into the most significant digit position of the counter 57 via the line 80. That under-range control flip-flop is then set once again by the trailing edge of the ramp-up signal on line 60 of the next sampling cycle. However, if a carry signal is not transmitted to the range control unit 75 over line 80, the under-range control flip-flop therein is not reset by the end of the current ramp-down phase. Instead, the under-range control flip-flop is reset by the trailing edge of the ramp-down control signal on line 63, after any delay that may be required for the propagation of a carry. With a parallel counter, a minimum delay, if any, would be required. Simultaneously, a pulse is transmitted to the bidirectional counter 76 over line 81 to increment the number registered therein.

Such simultaneous transmission of a pulse under control of a flip-flop being reset may be readily accomplished by one of various techniques known to those skilled in the art. For example, the line 81 may be connected to the output terminal of a gate which has one input terminal connected to the under-range control flip-flop and the other input terminal connected to the ramp-down control line 63. In that manner, if that under-range flip-flop has not already been reset through a separate control terminal connected to line 80 by the end of a ramp-down phase, the trailing edge of the ramp-down control signal will reset the flip-flop, but since the flip-flop requires a finite period of time to reset, the same trailing edge of the ramp-down control signal which resets the flip-flop is transmitted through the gate over the line 81 to the bidirectional counter 76. Once the bidirectional counter has been incremented, the combined gain of the amplifiers 50 and 51 is increased by a factor of 10.

A numerical display tube 82 is provided to indicate the number registered in the bidirectional counter 76. The scaling factor (×10) is permanently displayed with the tube 82 as shown such that the numeral displayed by the tube appears as an exponent for the scaling factor. A minus sign is also permanently displayed for the exponent of the scaling factor as shown for a system adapted for scaling down unknown input signals equal to or greater than 0.01 units. For other applications, the sign permanently displayed may be a plus, as illustrated in FIG. 5, roles of lines 79 and 81 to the counter 76 are reversed. Thus, a significant improvement is provided in the way digital data is presented for direct display and digital readout with only four numerical devices to cover a dynamic range of values from $0.01 \times 10^{19}$ to 9.99, or if the sign permanently displayed for the exponent is changed to a plus, a dynamic range of values from 0.01 to $9.99 \times 10^9$.

For an even greater dynamic range of values from $0.01 \times 10^{19}$ to $9.99 \times 10^9$, a reversible bidirectional counter with control of the sign may be provided. Suitable counters of that type have been described in the literature. Briefly, a counter of that type counts up and down in response to increment and decrement signals with a positive sign displayed until the counter has been decremented to zero and a further decrement pulse is received. At that time, the sign is changed from plus to minus and the roles of the increment and decrement lines are reversed such that, upon the application of another decrement pulse, the bidirectional counter again counts up from zero and upon the application of an increment pulse, it counts back down towards zero. When the count again reaches zero, and a further increment pulse is received, the sign displayed is changed back from minus to plus and the original roles of the increment and decrement lines are restored. In the meantime, gain of the amplifiers is suitably changed under control of both the sign and value of the exponent.

An over-range indicator 92 is energized by an out-of-range display unit 93 each time the bidirectional counter 76 is decremented. That may be accomplished by setting an over-range flip-flop in the display unit 93 in response to a decrement pulse transmitted over line 79 during a given cycle. The flip-flop then energizes the indicator 92, which may be, for example, a red lamp. The trailing edge of the ramp-up control signal transmitted by the integrator control unit 58 over line 60 thereafter resets that flip-flop during the next sampling cycle. If the counter is not decremented again, the flip-flop remains rest, and the indicator 92 is not energized again. If the counter 76 has been decremented to zero, and a further decrement pulse is applied to it over line 79, the over-range control flip-flop is set again. Since the gain of the amplifiers can not be further decreased, the indicator 92 will thereafter be energized, and only momentarily deenergized, during each subsequent cycle until the amplitude of the analog signal being converted to digital form decreases sufficiently to be within range.

An under-range indicator 95 is similarly energized by the out-of-range display unit 93 each time the bidirectional counter 76 is incremented. A second flip-flop may be provided in the display unit 93 for that purpose. It is set by an increment pulse on line 81, which occurs at the end of the ramp-down phase if no carry into the most significant digit position of the counter 57 was sensed over a line 80, as described hereinbefore. It is then reset by the trailing edge of the ramp-up signal on the line 60 during the next sampling cycle. If the counter is not incremented again, the flip-flop remains reset, and the indicator 95 is not energized again. If the counter 76 has been incremented to nine, and a further increment pulse is applied to it over line 81, the under-range control flip-flop is set again. Since the gain of the amplifiers can not be further increased, the indicator 95 will thereafter be energized by the trailing edge of the ramp-down control signal on line 63, and only momentarily deenergized during the ramp-up phase of each subsequent cycle until the amplitude of the analog signal being converted to digital form increases sufficiently to be within range.

Digital output in coded form, such as binary-coded-decimal form if the counters 57 and 76 are so designed, is available at output terminals connected to undecoded drive lines to the numerical display devices 71, 72 and 73, and to the undecoded drive lines of the display device 82, or the drive lines to decoder 77 as shown. Although only one terminal is shown for each, such as terminal 96 for the exponent in the bidirectional counter 76, it should be understood that each terminal shown represents as many as necessary for transmission of each coded digit in parallel. For example, if binary-coded-decimal counters are employed, each terminal shown represents four output terminals which may be connected to some digital utilization means, such as a digital computer.

Terminals 97 and 98 are similarly connected to the drive lines of indicators 92 and 95 to signal to the utilization means when an over or under-range condition has accrued during a given cycle. In that manner, the utilization means may be caused to disregard the data which may be read out at any time after the ramp-down phase of one cycle and before the ramp-up phase of the next cycle. Terminals 99 and 100 are provided to transmit those phase control signals to the utilization means. Thus, the utilization means will disregard (not read) digital output data if a signal is present on any one of the terminals 97 to 100. An operator will also disregard any value displayed upon seeing the data being changed or either indicator on.

Although particular embodiments of the invention have been described and illustrated herein, it is recognized that modifications and variations may readily occur to those skilled in the art and consequently it is intended that the claims be interpreted to cover such modifications and equivalents.

What I claim is

1. An electronic metering system for producing at output terminals a voltage signal to be applied to a utilization means, said voltage signal being proportional to the magnitude of some environmental condition, comprising:
    a transducer having a predetermined performance characteristic for providing an electrical signal which varies as a function of said environmental condition;
    an amplifier having input and output terminals, said amplifier being adapted to provide a voltage signal between its output terminals proportional to an electrical signal present between its input terminals;
    first means for coupling said transducer between said input terminals of said amplifier;
    second means for conducting current having an impedance characteristic which varies as a function of said environmental condition;
    third means for subjecting said second means to the same environmental condition as said transducer; and
    fourth means for connecting said second means between said output terminals of said amplifier, and coupling said second means to said output terminals of said system, said fourth means including a substantially constant impedance means connected in series with said second means between said output terminals of said amplifier, and wherein one of said constant impedance means and said second means is coupled between said system output terminals, whereby variations in said impedance characteristic of said second means modify said electrical signal at said system output terminals to compensate for variations in the performance characteristic of said transducer, said system output terminals being adapted to be connected to a utilization means.

2. An electronic metering system as defined in claim 1 wherein said second means comprises two sections connected in series, and wherein said fourth means includes means for selectively switching said coupling of one of said system output terminals from a junction between said second means and said constant impedance means to a junction between said sections of said second means, thereby selectively altering said compensating scaling factor.

3. An electronic metering system as defined in claim 2 wherein said transducer is a photovoltaic cell and the impedance of one section of said second means is selected in proportion to the other section thereof to scale the signal at said system output terminals down from units of radiant energy to units of optical beam current as said switching means selectively switches said coupling of one of said system output terminals from between said second means and said constant impedance means to said junction between said two series connected sections.

4. An electronic metering system as defined in claim 1 wherein said second means is coupled between said system output terminals.

5. An electronic metering system as defined in claim 4 wherein said transducer provides an output signal which increases with an increase in temperature and wherein said second means has an impedance which decreases with an increase in temperature.

6. An electronic metering system as defined in claim 1 wherein said constant impedance means is coupled between said system output terminals.

7. An electronic metering system as defined in claim 6 wherein said transducer provides an output signal which increases with an increase in temperature and wherein said second means has an impedance which increases with an increase in temperature.

8. An electronic metering system as defined in claim 1 wherein the impedance ratio of one of said second means and said constant impedance means to the sum of said second means and said constant impedance means is so selected as to calibrate said system for deviation of the performance characteristic of said transducer from a predetermined theoretical performance characteristic.

9. An electronic metering system as defined in claim 8 wherein said amplifier has a gain greater than unity, whereby said system may be calibrated for a performance characteristic of said transducer less than a predetermined theoretical performance characteristic.

10. An electronic metering system as defined in claim 1 including means for selectively switching a constant current through the one of said constant impedance means and said second means that is coupled to said system output terminals, whereby any voltage signal present between said output terminals of said amplifier is translated to said system output terminals with a compensating scaling factor and an algebraically added constant.

11. An electronic metering system as defined in claim 1 wherein
said second means comprises a resistive element the resistance of which varies as a function of said condition; and
said constant impedance means is a constant resistor.

12. An electronic metering system as defined in claim 11 wherein said resistive element is divided into two series connected sections, and wherein said fourth means includes means for selectively switching said coupling of one of said system output terminals from a junction between said resistive element and said resistor to said junction between said sections of said resistive element.

13. An electronic metering system as defined in claim 12 including means for selectively switching a constant current through the one of said resistive element and said constant resistor that is coupled to said system output terminals, whereby any voltage present between said output terminals of said amplifier is translated to said system output terminals with a compensating scaling factor and an algebraically added constant.

14. An electronic metering system as defined in claim 11 wherein the ratio of the resistance of the one of said resistive element and said constant resistor that is coupled between said output terminals of said system to the sum of the resistance of both said resistive element and said resistor is selected to compensate for the efficiency of said transducer, whereby any voltage signal present between said output terminals of said amplifier is translated to said system output terminals as a voltage signal compensated for variations in the performance of said transducer due to variations of said environmental condition and calibrated for the efficiency of said transducer.

15. An electronic metering system as defined in claim 14 wherein said environmental condition is temperature and the resistance of said resistive element varies as function of temperature in a compensating manner over a predetermined range of temperatures.

16. An electronic metering system as defined in claim 15 wherein said transducer is a photovoltaic cell and said resistive element comprises two temperature dependent sections connected in series, and wherein said fourth means includes means for selectively switching said coupling of one of said system output terminals from a junction between said resistive element and said constant resistor to a junction between said sections of said resistive element, and wherein the resistance of each of said sections is selected to alter the calibrating scale factor provided by said resistive element and said constant resistor, whereby any voltage signal present between said output terminals of said amplifier is translated to said system output terminals as a voltage signal selectively proportional to the radiant energy or photon beam current of light to which said transducer is exposed.

17. An electronic metering system as defined in claim 1 wherein said transducer is a thermocouple and said environmental condition is the environmental temperature of the thermocouple reference junctions, said second means comprises a temperature dependent resistive element, and said constant impedance means comprises a constant resistor in series with said resistive element.

18. An electronic metering system as defined in claim 17 wherein said resistive element comprises two temperature independent resistive sections in series, and wherein said fourth means includes means for selectively switching said coupling of one of said output terminals of said system from a junction between said resistive element and said constant resistor to a junction between said two sections of said resistive element, thereby selectively altering said compensating scaling factor.

19. An electronic metering system as defined in claim 18 including means for selectively switching a constant current through whichever of said independent resistive sections and said constant resistor is coupled between said system output terminals, whereby any voltage signal present between said output terminals of said amplifier is translated to said system output terminals with a compensating scaling factor and an algebraically added constant.

20. An electronic metering system as defined in claim 1 wherein said utilization means comprises a digital display unit and means for coupling said unit to said system output terminals, said unit comprising:
a cyclic analog-to-digital converter with means for displaying a numerical value representing the amplitude of a signal at said system output terminals during a given cycle in a given radix notation with a predetermined number of digits, a fixed radix point and a radix factor with an exponent in said given radix notation;

out-of-range detecting means connected to said converter for determining when, upon performing a given conversion cycle, the value to be displayed exceeds the largest value that can be displayed by said predetermined number of digits with a given exponent; and scaling means connected to said detecting means for changing said exponent to increase the value of said radix factor and correspondingly decreasing the scale of said signal applied to said analog-to-digital converter for conversion and display during the next cycle.

21. An electronic metering system as defined in claim 20 wherein said out-of-range detecting means further determines when upon performing a given cycle the value to be displayed includes a zero in the most significant digit position, and wherein said scaling means connected to said detecting means includes means for changing said exponent to decrease the value of said radix factor and correspondingly increasing the scale of said signal applied to said analog-to-digital converter for conversion and display during the next cycle.

22. An electronic metering system as defined in claim 20 wherein said analog-to-digital converter includes a counter which counts up from zero to a value representing said signal amplitude during each sampling cycle, and said out-of-range detecting means determines when the value to be displayed exceeds said largest value by detecting a carry from the most significant digit position of said counter during a given sampling cycle.

23. An electronic metering system as defined in claim 21 wherein said analog-to-digital converter includes digital means for counting up from zero to a value representing said signal amplitude during each sampling cycle, and said out-of-range detecting means determines when the value to be displayed includes a zero in the most significant digit position by detecting a failure of said counting means to produce a carry out of the next most significant digit position thereof during a given sampling cycle.

24. An electronic metering system as defined in claim 23 wherein said exponent is negative, and the response of said scaling means to a detection of a carry from the most significant digit position of said counting means is a decrease of the exponent by one, and to a detection of a failure to produce a carry out of the next most significant digit position of said counting means is an increase of the exponent by a value one.

25. An electronic metering system as defined in claim 23 wherein said exponent is positive, the response to carry from the most significant digit position of said counting means is to increase the exponent by one, and the response to a failure to produce a carry out of the next most significant digit position of said counting means is to decrease the exponent by a value of one.

26. An electronic metering system as defined in claim 21 wherein said radix is ten, and said means for displaying a numerical value consists of a fixed number of alterable decimal digits, each physically displayed in a fixed position relative to a permanent decimal point, and a permanent number ten with an alterable decimal exponent physically displayed in a fixed exponential position, said permanent number ten being disposed in line with and to the right of said fixed number of alterable digits.

27. An electronic metering system as defined in claim 26 including output terminals associated with said alterable decimal digits and said alterable decimal exponent for transmission therefrom of electrical signals representative of said digits and exponent being displayed.

28. An electronic metering system as defined by claim 27 wherein said output terminals are provided for transfer of alterable data displayed to digital means for utilizing said data.

29. An electronic metering system as defined by claim 28 including means for indicating to said data utilization means when said out-of-range detecting means has caused said scale of said signal applied to said analog-to-digital converter to be altered for conversion and display during a given cycle.

30. An electronic metering system as defined by claim 29 including means for indicating to said data utilization means when said analog-to-digital conversion has been completed by said converter during a given cycle.